United States Patent [19]

Salamey

[11] Patent Number: 5,899,672
[45] Date of Patent: May 4, 1999

[54] ELECTROMAGNETIC PUMP WITH MAGNETICALLY SEPARATED CYLINDERS

[76] Inventor: Laurence R. Salamey, 110 Schoolhouse Rd, Deerfield, N.Y. 13502

[21] Appl. No.: 09/018,308

[22] Filed: Feb. 3, 1998

Related U.S. Application Data

[63] Continuation-in-part of application No. 08/588,887, Jan. 19, 1996, Pat. No. 5,713,728.

[51] Int. Cl.$^6$ ...................................................... F04B 35/04
[52] U.S. Cl. .......................... 417/418; 417/534; 92/170.1
[58] Field of Search .................................... 417/418, 534; 92/170.1

[56] References Cited

U.S. PATENT DOCUMENTS 2,515,110  5/1950  Bornstein ................................. 417/418
2,690,128  3/1954  Basilewsky .............................. 417/418
2,833,220  10/1958  Robinson et al. ....................... 417/418

Primary Examiner—Charles G. Freay
Assistant Examiner—Paul Ratcliffe
Attorney, Agent, or Firm—Venable Norman N. Kunitz

[57] ABSTRACT

A positive displacement inductive pump which includes a pair of steel cylinders or sleeves having a non-magnetic corrosion resistant inner surface and non-magnetic alloy rings disposed at each cylinder end. Three ferromagnetic pole pieces having an axial opening are provided with each cylinder disposed between a respective pair of the pole pieces and connected to the pole pieces with the alloy rings. A pair of oppositely disposed steel plates connected to the pole pieces forms a magnetically conductive circuit between the pole pieces. A piston positioned within the bore defining a displacement chamber adjacent to each end of the bore. The piston includes a rod formed of magnetic material with a corrosion resistant lining encapsulating the rod. The pistons outer lining surface forms a seal with the material on the inner surface of the cylinders. Respective inductive coils are wound around each cylinder and are alternatingly energized to produce magnetic fields which cause the piston to move to oppositely located ends of the bore. Respective check valve assemblies are attached to each outer pole piece at the ends of the bore. The check valve assemblies allow for the ingress and egress of material into and out of the associated adjacent displacement chamber dependent upon the directional movement of the piston.

7 Claims, 2 Drawing Sheets

ELECTROMAGNETIC PUMP WITH MAGNETICALLY SEPARATED CYLINDERS

CROSS REFERENCE TO RELATED APPLICATION

This application is a continuation in part of allowed U.S. patent application Ser. No. 08/588,887, filed Jan. 19, 1996, now U.S. Pat. No. 5,713,728 the subject matter of which is incorporated herein by reference.

BACKGROUND OF THE INVENTION

The present invention relates to an improved positive displacement inductive pump. More particularly, the present invention relates to an improved positive displacement conductive pump of the type disclosed in the parent application.

The conductive pump disclosed in the parent application, essentially comprises a piston formed of magnetic material which is disposed within a bore for movement therein as a result of magnetic fields applied to the piston to move same back and forth within the bore. Each of the two ends of the bore is generally closed off by a respective check-valve assembly which permits ingress and egress to the respective displacement chambers formed at the respective ends of the bore. Reciprocal movement of the piston is provided by a magnetic field produced by coils surrounding the bore and to the piston via a magnetic circuit. The pump described in the parent application is particularly suited for use in corrosive atmospheres by providing the piston with a non-magnetic sheath of a corrosion resistant material and by forming the bore in a nonmagnetic corrosion resistant housing, with a seal being formed between the outer surface of the piston and the wall defining the bore. To improve the transfer of the magnetic energy from the coils to the piston, a novel magnetic circuit wit a frame construction is provided.

Although the pump according to the parent application generally operates satisfactorily for its intended purpose, it is desirable to provide for increased pressure for the pump by further increasing the magnetic energy transfer efficiency, as well as to manufacture the pump in a more economical manner. It is therefore the object of the present invention to provided an improved positive displacement inductive pump that not only contains the corrosion resistant and energy transferring features according to the parent application, but moreover can provide a further increased magnetic power transfer to the piston and can be manufactured in a more robust and inexpensive manner.

SUMMARY OF THE INVENTION

The above and other objects generally are accomplished according to the present invention by a positive displacement inductive pump that comprises: first and second cylinders, each formed of ferromagnetic steel and having a non-magnetic corrosion resistant material covering its inner surface; a respective ring of a non magnetic alloy disposed at each end of each of the cylinders; first, second and third pole pieces each formed of a ferromagnetic material and having an axial opening, with each of the cylinders being coaxially disposed between a respective pair of the pole pieces and connected to the respective pole pieces via the respective rings to form a continuous axial bore but with said cylinders being magnetically separated from the respective pole pieces via the respective rings; first and second oppositely disposed steel plates connecting peripheral edges of the first, second and third pole pieces together to form a magnetically conductive circuit between adjacent ones of the pole pieces; a piston positioned entirely within the bore and being of a length less than that of the bore to define a displacement chamber adjacent each end of the bore, with the piston including a rod formed of a magnetic material and a corrosion resistant lining completely encapsulating the rod and forming a seal between the outer surface of the piston and the material on the inner surface of said cylinders; first and second inductive coils each wound around a respective one of the cylinders and each being alternatingly energizable to produce respective first and second induced magnetic fields causing the piston to move to oppositely located first and second positions within the bore; and, a respective check valve assembly attached to each of the outer of the pole pieces at the respective ends of the bore and in communication with the associated displacement chamber to close the associated ends of the bore, the check valve assemblies allowing for the respective ingress and egress of a material into and out of the associated adjacent displacement chamber through the check valve assembly and in dependence on a respective directional movement of the piston.

The steel frame provide by the three pole pieces and the two outer plates provides a circuit for the magnetic field through and around the outside of the coils, and through the piston. However, the nonmagnetic alloy rings separating the cylinders from the pole pieces prevents the magnetic fields produced by the coils from passing axially through the cylinders so that the magnetic fields are concentrated in the piston, thus delivering more energy to the piston to move same. Additionally, the use of a steel, i,.e., magnetic material, sleeve or cylinder between adjacent pole pieces, even though not in the magnetic circuit of the coils, allows a greater transfer of the magnetic field to the inner core piston than in the pump arrangement according to the parent application due to the greater magnetic permeability of the material of the cylinders relative to the plastic resins used for the pump housing of the prior arrangement.

It is advantageous to arrange two of the pole pieces as close to the end of the respective coils as possible, because the piston will attempt to center itself in the center of the energized coil, and the end of the piston will attempt to align itself with the edge of the pole piece located adjacent to the respective coil. Preferably, the length of the piston should not be less than the distance between two adjacent of the pole pieces, and is preferably not more than twice this distance. If the piston is longer than the distance between two adjacent pole pieces, and hence longer than one coil, one end of the piston will attempt to align itself with the edge of one pole piece of steel, while the other pole piece will be aligned at any position along the length of the piston, completing the magnetic field without loss of force.

The invention will be described below in greater detail in connection with an embodiment thereof illustrated in the drawing figures.

DETAILED DESCRIPTION OF THE INVENTION

Figure 1:
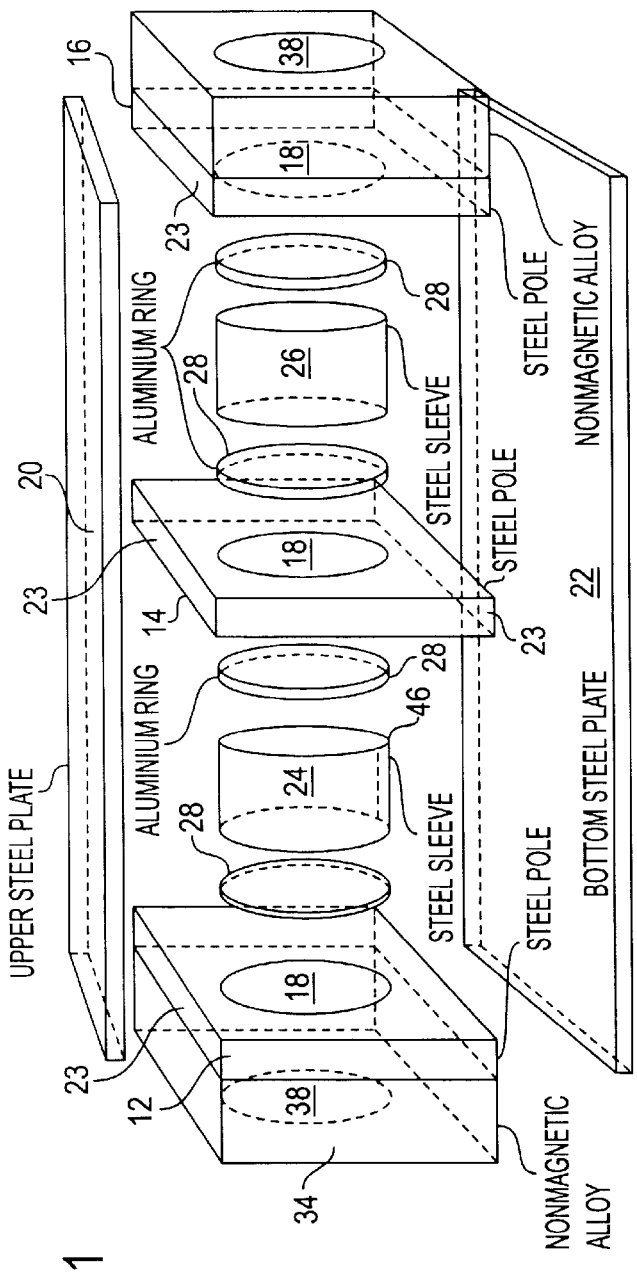
FIG. 1 is a schematic exploded view of an improved positive displacement inductive pump according to the invention.
Figure 2:
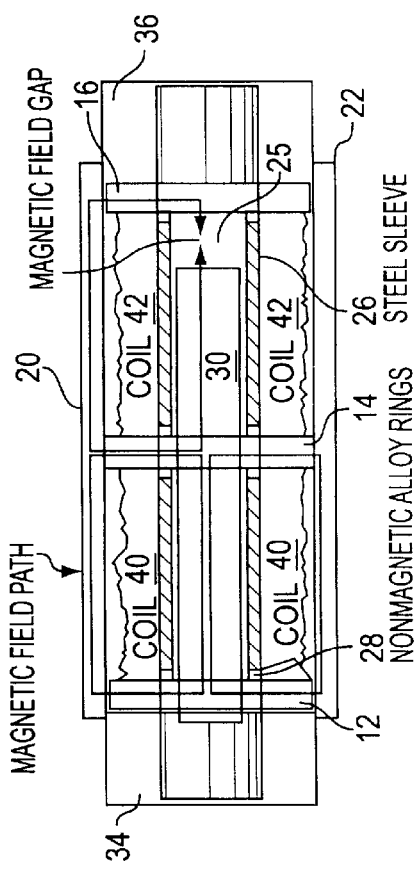
FIG. 2 is a schematic side view of the inductive pump according to the invention.
Figure 3:
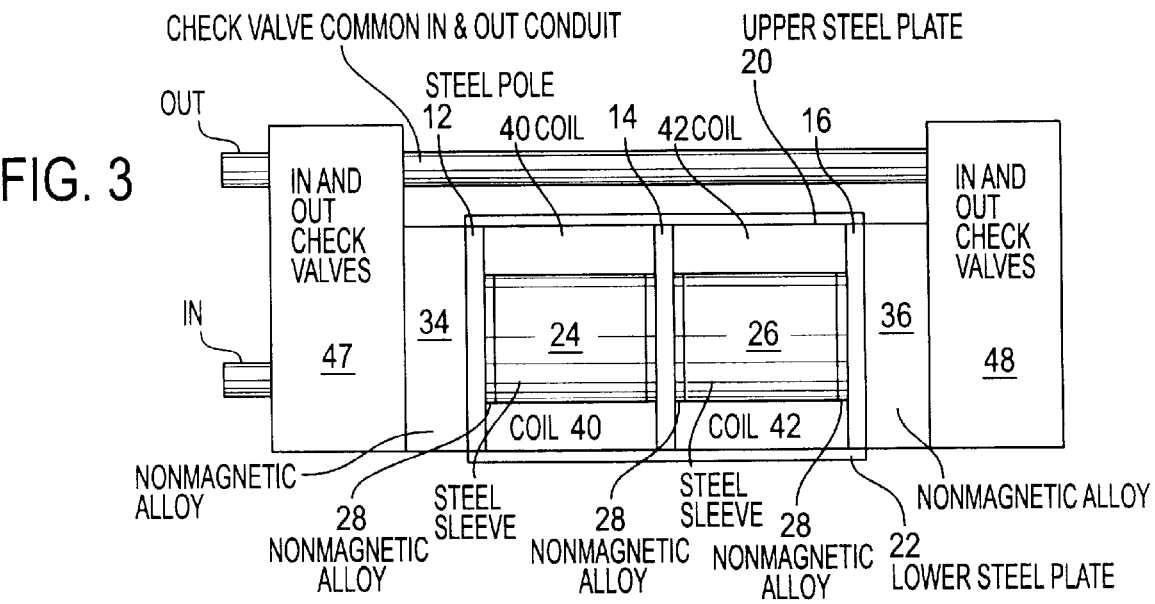
FIG. 3 is a schematic partial sectional view of the pump of FIG. 1 in the assembled state and illustrating the magnetic paths.

Referring now to FIGS. 1–3, there is shown the improved conductive pump 10 according to the invention which generally includes a frame formed from steel, i.e., ferromagnetic material, including three axially spaced pole pieces 12, 14, and 16, as well as an upper and a lower steel plate 20 and 22, respectively. The three pole pieces 12, 14, and 16 are generally in the form of steel plates of a square or rectangular shape, and are each provided with an axial opening 18. The upper and lower steel plates 20 and 22, respectively, are disposed opposite one another and contact and are connected to the respective peripheral edges 23 of the pole pieces or plates 12, 14 and 16.

Disposed between each pair of adjacent pole pieces or plates 12, 14 and 14, 16 is a respective cylinder or sleeve 24 or 26 formed of steel, i.e., ferromagnetic material. Each end of each of the cylinders or sleeves 24 and 26 is provided with a respective ring 28 of a nonmagnetic alloy, for example, aluminum, by means of which the respective ends are connected to the steel pole pieces 12, 14 and 16 as can be seen in FIGS. 2 and 3. As a result of this placement of the rings 28, there is no magnetic conductivity via the sleeves or cylinders 24 and 26 in the axial direction between the adjacent pole pieces 12, 14 or 16. Moreover, due to the above described assembly of the various pieces 12, 14, 16, 20, 22, 24, 26 and 28, an actual bore 25 (see FIG. 3) is provided at least between the two outer pole pieces 12 and 16 for receiving a piston 30 as shown in FIG. 3. Preferably, according to the figures, the bore 25 for receiving the piston 30 is elongated in the axial direction by providing a respective member 34 or 36 of a nonmagnetic alloy, for example, aluminum, on the outer surface of the respective outer pole pieces 12 and 16, with each of these members 34 and 36 having an axial opening or bore 38 substantially the same size as the inner diameter of the cylinders 24 and 26 in order to sealingly engage the outer surface of the piston 30. The members 34 and 36 are generally the same shape as the pole pieces 12 and 16 to which they respectively are attached and have a desired thickness in the axial direction to extend the bore 25 sufficient to accept an end of the piston 30 as shown in FIG. 2 when the piston is moved to one of its end positions such that it extends axially beyond the outer surface of an outer pole piece 12 or 16.

As shown in FIGS. 2 and 3, a coil 40 is wound about the cylinder 24 and a coil 42 is wound about the cylinder 26. The coils 40 and 42 are each alternatingly energizable in a known manner to produce respective first and second conducive magnetized fields causing the piston 30 to move to oppositely located positions within the bore 25.

The piston 30 is in the shape of a metal rod 44 (see FIGS. 4 and 5) of a length less than that of the bore and is positioned entirely within the bore 25 to define a displacement chamber adjacent each end of the bore depending upon the position of the piston 30 within the bore. Typically the metal rod 44 is comprised of a ferromagnetic material, preferably of the uniform diameter, and as described in the above identified parent application, it is completely encapsulated by a corrosion resistance lining 45. Preferably the lining 45 is comprised of polymer plastic, for example, a vinyl ester resin, or any other non-magnetic material which will be corrosion resistant to the substance being pumped. Moreover, the inner surface of each of the sleeves or cylinders 24, 26 is provided with a thin lining 46 of a similar corrosion resistant material which lining may be permanently fixed to the inner surface of the cylinders 24 and 26 or be provided as a removable sleeve in the manner described in the parent application.

As shown in FIG. 3, a respective check valve assembly 47 or 48 is connected to the outer surface of each of the members 34 and 36 and is in communication with the displacement chambers via the respective axial openings 38. In a known manner, the check valve assemblies 47 and 48 allow for the respective ingress and egress of material into and out of the associated displacement chambers through the check valve assemblies, and in dependence on respective directional movement of the piston 30. In a known manner, as is described in more detail in the parent application, the check valve assemblies 47 and 48 each include at least two flow passages, each allowing for the unidirectional flow of the pump material.

As shown, the two check valve assemblies 47 and 48 are interconnected in a conventional manner, for example, as described in the parent application, so that material is drawn into the displacement chamber at one end of the bore 25 simultaneously with material being expelled under pressure from the displacement chamber at the opposite end of the bore 25 in a semi-continuous manner. In this manner, a substantially continuous, laminar type flow can be maintained at the output of the pump.

The magnetic field operation of the piston is shown in FIG. 2 wherein the piston is shown in the position caused by an energization of the coil 40. In this position, a magnetic field path exist, as shown, through the two pole pieces 12, 14, the top and bottom plates 20 and 22, and the rod or core 44 of the piston 30. The magnetic field cannot short circuit through the steel sleeve 24 because of the non-magnetic alloy rings 28 disposed between each end of the sleeve or cylinder 24 and the respective pole pieces 12 and 14. Therefore, there is no significant magnetic field passing through the ferromagnetic cylinder 24 in the axial direction. Subsequently, when the coil 42 is energized, to cause the piston to move to the other end of the bore 25, the illustrated magnetic field gap causes the piston 30 to be pulled toward the pole piece 16, allowing the continuous flow of the magnetic field. If it were not for the non-magnetic alloy rings 28, a significant portion of the magnetic field would be short circuited through the cylinders 24 and 26 substantially defining the bore 25, thus reducing the force generated on the piston itself. Thus, with the arrangement according to the invention, an increased magnetic force or energy is exerted on the piston, thus permitting a desired pressure to be realized in a more efficient manner.

Figure 4:
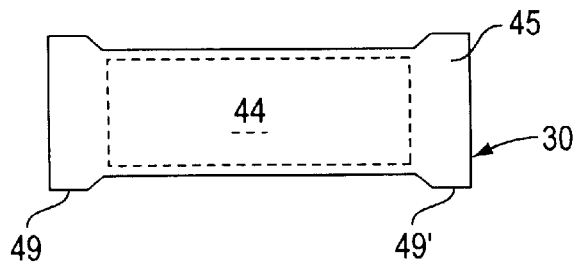
FIGS. 4 and 5 illustrate two different configurations of the piston of the inductive pump.

To prevent the flow of material around the piston 30, the corrosion resistant lining 45 can be manufactured so that it sealingly engages with the lining 46 on the inner surface of the cylinders 24 and 26. In such case, the corrosion resistant lining typically has a thickness of about one-sixteenth of an inch in a region of the metal rod 44. However, as shown in FIG. 4, preferably the corrosion resistant lining 45 extends beyond each end of the metal rod 44, for example, by one-half inch, to define two oppositely located extended regions 49, 49' each having a diameter essentially corresponding to a diameter of the bore 25. Further, in a region of the metal rod 44, the corrosion resistant lining 45 has a diameter less than the diameter of the extended regions 49,49'. In this manner, the extended regions 49, 49' are in sealing engagement with the wall defining the bore.

Figure 5:
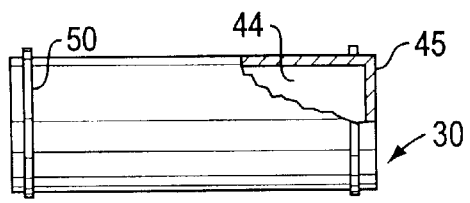

Alternatively, as shown in FIG. 5, at least one seal 50, preferably two as shown, can be attached to the surface of the piston 30 so as to engage with the wall defining the bore 25.

The invention now being fully described, it will be apparent to one of ordinary skill in the art that any changes and modifications can be made thereto without departing from the spirit or scope of the invention as set forth herein.

What is claimed:

1. A positive displacement inductive pump, comprising:

first and second cylinders, each formed of ferromagnetic steel and having a non-magnetic corrosion resistant material covering its inner surface;

a respective ring of a non magnetic alloy disposed at each end of each of said cylinders;

first, second and third pole pieces formed of a ferromagnetic material and each having a respective axial opening, with each of said cylinders being coaxially disposed between a respective pair of said pole pieces and connected to the respective pole pieces via the respective rings to form a continuous axial bore but with said cylinders being magnetically separated from the respective pole pieces via the respective said rings;

first and second oppositely disposed steel plates connecting peripheral edges of said first, second and third pole pieces together to form a magnetically conductive circuit between adjacent of said pole pieces;

a piston positioned entirely within the bore and being of a length less than that of the bore to define a displacement chamber adjacent each end of said bore, with said piston including a rod formed of a magnetic material and a corrosion resistant lining completely encapsulating said metal rod and forming a seal between the outer surface of said piston and the material on said inner surface of said cylinders;

first and second inductive coils each wrapped around a respective one of said cylinders and each being alternatingly energizable to produce respective first and second induced magnetic fields causing said piston to move to oppositely located first and second positions within the bore; and, a respective check valve assembly attached to each of the outer of said pole pieces at the respective ends of said bore and in communication with the associated displacement chamber to close the associated ends of said bore, said check valve assemblies allowing for the respective ingress and egress of a material into and out of the associated adjacent displacement chamber through said check valve assembly and in dependence on a respective directional movement of said piston.

2. The positive displacement inductive pump defined in claim 1, wherein a respective member, formed of nonmagnetic alloy and having an axial opening, is disposed between each of the outer pole pieces and the respective one of the check valve assemblies to extend the length of said bore.

3. The positive displacement inductive pump defined in claim 1, wherein said piston has a consistent diameter along substantially its entire length and is of substantially the same diameter as said bore.

4. The positive displacement inductive pump defined in claim 1, wherein said corrosion resistant lining comprises a polymer plastic.

5. The positive displacement inductive pump defined in claim 1, wherein said first, second and third pole pieces are rectangular shaped steel plates.

6. The positive displacement inductive pump defined in claim 1, wherein said piston has a length greater than a distance between any adjacent two of said first second and third pole pieces.

7. The positive displacement inductive pump defined in claim 1, wherein said corrosion resistant lining extends beyond each end of said metal rod to define two oppositely located extended regions each having a diameter essentially corresponding to a diameter of the bore, so that said extended regions provide the seal; and said corrosion resistant lining has a diameter in a region of said metal rod which is less than the diameter of said extended regions.

* * * * *